July 7, 1925.

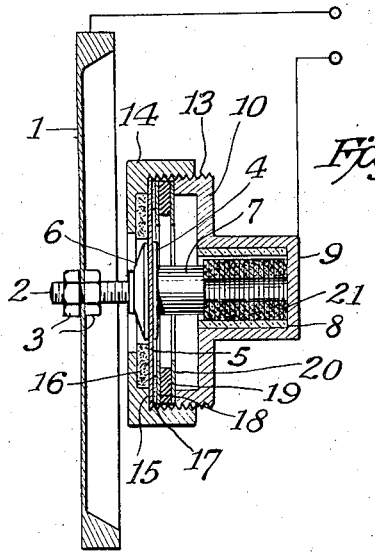
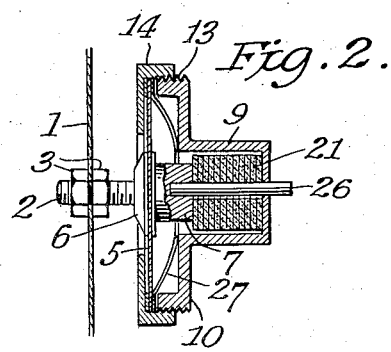
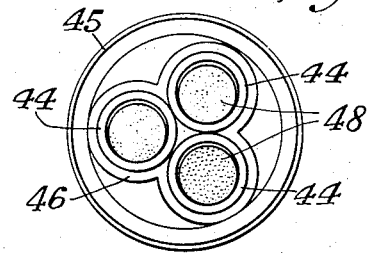
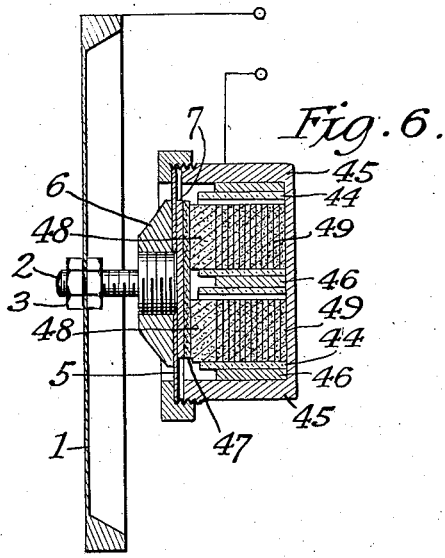
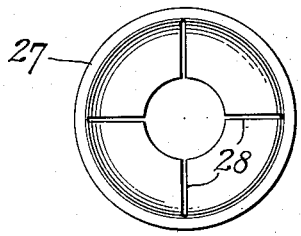
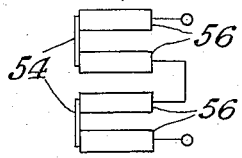
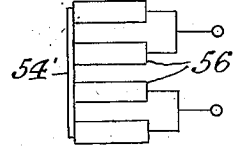

W. L. WALKER

MICROPHONE

Filed April 12, 1922     3 Sheets-Sheet 2

1,544,786

Inventor
William L. Walker.
By his Attorneys
Sheffield & Betts

July 7, 1925.

W. L. WALKER

MICROPHONE

Filed April 12, 1922

Inventor
William L. Walker
By his Attorneys
Sheffield & Betts

Patented July 7, 1925.

1,544,786

UNITED STATES PATENT OFFICE.

WILLIAM L. WALKER, OF NEW YORK, N. Y., ASSIGNOR TO WALKER SIGNAL & EQUIPMENT CORPORATION, OF NEW YORK, N. Y., A CORPORATION OF DELAWARE.

MICROPHONE.

Application filed April 12, 1922. Serial No. 552,023.

*To all whom it may concern:*

Be it known that I, WILLIAM L. WALKER, a citizen of the United States, residing in the borough of Manhattan, city, county, and State of New York, have invented certain new and useful Improvements in Microphones, of which the following is a full, clear, concise, and exact description.

My invention relates particularly to microphones for use in the transmission of sound signals, and is particularly adapted to the reception of submarine sound signals by which sounds are communicated from the source of sound, such as a submarine bell, to vessels navigating the ocean in the vicinity of the same. However, I do not wish it to be understood that my invention is limited to this particular use, for it is unusually well adapted for use in other devices, instances of which will be hereinafter pointed out. The object of my invention is to improve the sensitiveness and selectivity of microphones in general, and more especially for the uses above mentioned, and involves certain improvements over the invention of my prior application Serial No. 491,715, filed August 12, 1921. Further objects and advantages of this invention will be apparent from the following specification read in connection with the accompanying drawing forming a part thereof, in which—

Fig. 1 is a diametral sectional view of one form of my improved microphone attached to a receiving diaphragm.

Fig. 2 is a similar sectional view of a modification thereof.

Fig. 3 is a plan view of a spring washer as used in the modification illustrated in Fig. 2.

Fig. 6 is a transverse sectional view of another modification, while Fig. 7 is an end view thereof showing the cap and diaphragms removed.

Fig. 8 is a transverse sectional view of a third modification, while

Figure 9:
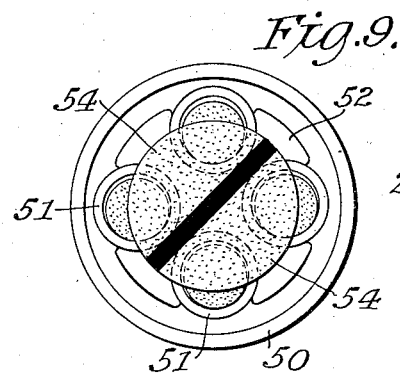
Fig. 9 is an end view of the same showing the cap and diaphragms removed.
Figure 8:
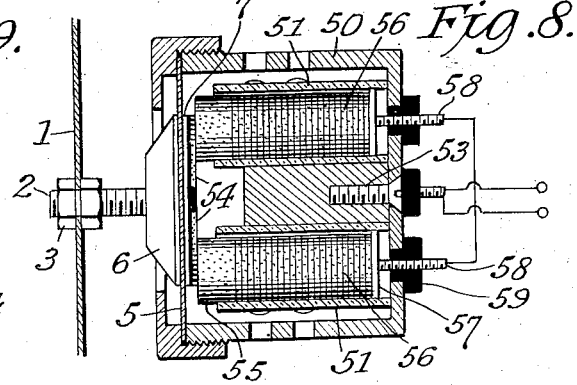

Figs. 10$^a$ and 10$^b$ are schematic illustrations of the electrical connections capable of being made in the modification of Figs. 8 and 9.

Figure 11:
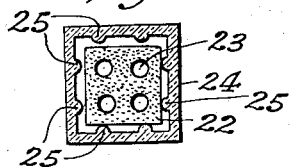

Fig. 11 is a transverse sectional view of a modified form of insulating cylinder containing square carbon resistance elements.

Figure 12:
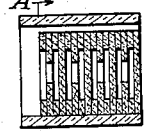

Fig. 12 is a transverse sectional view of an insulating cylinder containing a modified arrangement of circular resistance varying elements.

Figure 13:
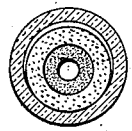

Fig. 13 is a transverse sectional view of Fig. 12 taken substantially on the line A—A.

Figure 14:
Figure 15:

Fig. 14 is a plan view of the second resistance varying disk of Fig. 12, while Fig. 15 is a plan view of the third resistance varying disk of Fig. 12.

Figure 16:
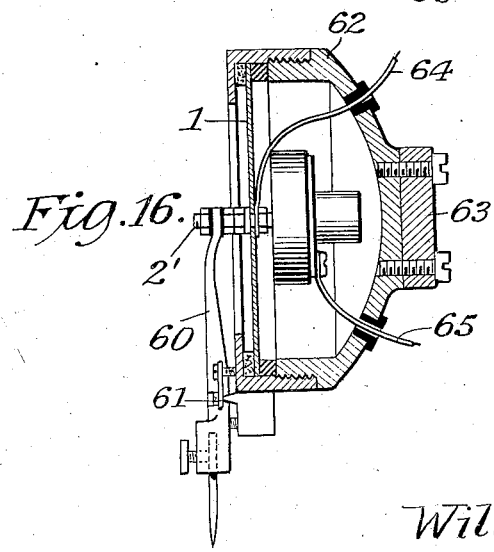
Figure 17:
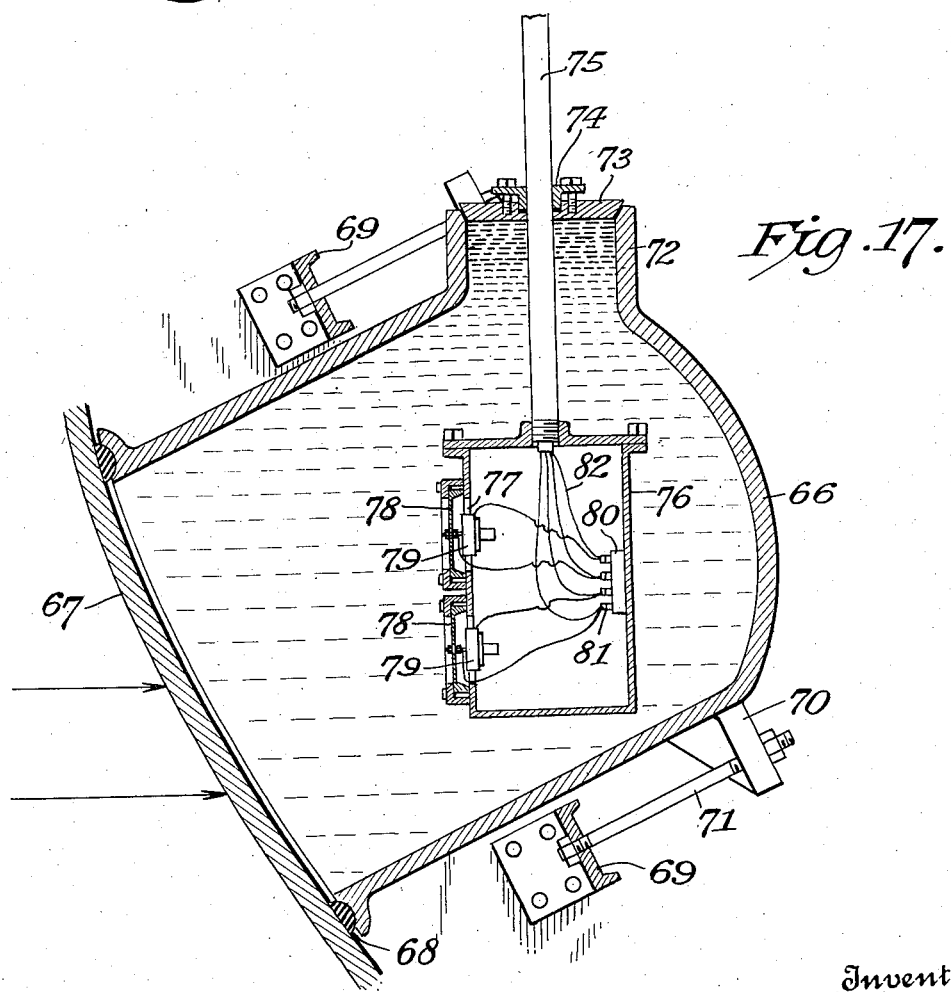

Fig. 16 is a transverse sectional view of my improved microphone as applied to a sound box or reproducer of a phonograph or talking machine; and Fig. 17 is a transverse sectional view of a receiving apparatus applied to the interior of the hull of a vessel and adapted to receive submarine signals.

Referring to Fig. 1, the numeral 1 indicates a sound receiving diaphragm, either metallic or of other resilient material, such as mica. In Fig. 1, however, the diaphragm is preferably turned from phosphor-bronze or other resilient material, particularly when used as indicated in Fig. 17. This diaphragm may be mounted in any suitable way, such as indicated in Figs. 16 and 17. Connected with the central point of the diaphragm 1 is a screw-threaded stud or pin 2 held in position on said diaphragm by means of small nuts 3. The stud 2 is preferably integral with the plate 4 which engages the inner side of a small mica diaphragm 5 through which the stud passes. A nut or internally threaded disk 6 engages the outer side of said diaphragm 5 and holds said stud 2 in position thereon. Projecting from the inner surface of said plate 4 is a cylindrical boss 7 which projects slightly within the end of a tube 8 of insulating material, preferably glass or other material having a highly polished surface to reduce friction. The tube 8 is supported within a casing 9 which has an annular portion 10 carrying a screw-threaded flange 13 which engages an internally screw-threaded retaining ring 14. The diaphragm 5 is adapted to be held in position between the screw-threaded flange 13 and the interior of the ring or cap 14 in the following manner:

The cap 14 is provided with an external annular shoulder 15 within which is a soft, resilient washer 16 of felt or similar material. The diaphragm 5 rests upon the shoulder 15, and contacting with its inner surface is a gasket of varnished cloth or similar material 17. Contacting with the inner surface of said gasket is a thin steel washer 18, and the latter contacts with a resilient gasket 19 made of rubber or similar material. Within the resilient gasket 19 is a second steel washer 20 which rests upon the end of the annular flange portion 13 of the casing. Within the insulating tube 8 are a series of resistance varying elements made of suitable material, such as carbon disks, as indicated by the numeral 21. These disks fit the insulating tube rather loosely and are adapted to contact with the end of the boss 7, and with the end of the casing 9 between which parts of the disk are held under pressure. This pressure may be varied by adjusting the ring or cap 14 on the screw-threaded flange 13, movement of said cap, compressing the rubber gasket 19 more or less, and transferring the pressure thereby produced on the diaphragm 5 to the boss 7, and consequently the disks 21. The disks 21 may be made in various shapes, such as indicated in Figs. 11 to 15 inclusive and these various shapes may be applied to any of the modifications hereinafter mentioned. The resistance varying elements or carbon disks 21 are preferably provided with transverse openings or holes as indicated in the figures above referred to, and the holes may be arranged in various ways, depending upon the sensitiveness of the microphone required.

In Fig. 1 I have shown central openings through each of the carbon disks. In Fig. 11 I have shown square carbon plates 22 having four eccentric openings 23 arranged symmetrically therein. In order that the eccentric openings in said plates may always register, it is necessary to prevent their turning relative to each other. This is accomplished by making the plates angular or square, as indicated in Fig. 11 and the retaining tube also square. In this form the plates are preferably supported by a series of longitudinal ribs 25 within the tube, giving contacts at various separated points only on each side to reduce friction.

It will be appreciated that by using the openings or holes in the resistance varying elements in the form of plates or disks, the effective contacts between the successive plates may be varied; that is, the greater the number the openings or the larger the size of the openings provided, the less is the area between the contacting surfaces, and therefore the smaller the number of minute granular contacts between the successive disks which, depending upon the pressure between the disks, enables one to greatly vary the amount of current which can flow through the disks, thereby greatly changing the sensitiveness of the microphone. I have found also that variation of the size of the openings in these disks or plates also varies the natural vibration period or responsiveness of the microphone to certain sounds or periods of vibration, as distinguished from other sounds or periods of vibration. The openings through the plates or disks, therefore, apparently have an important bearing upon the resonance of the microphone, forming small chambers within which the air may act through its elasticity and fluidity to greatly vary the characteristics of the microphone.

Figs. 12 to 15 inclusive illustrate a combination of various disks forming small chambers consisting successively of the disks having a large diameter, as in Fig. 13, a small diameter, as in Fig. 14, and then no opening, as in Fig. 15, this arrangement being successively repeated, as indicated in Fig. 12. Obviously, numerous other arrangements may be made which will be particularly effective under various conditions and requirements.

Referring now to Fig. 2, the modification illustrated therein is somewhat similar to that of Fig. 1, the main differences being that instead of an insulating cylinder 8, I have provided a central insulating support in the form of a rod 26, preferably of glass, bakelite or similar insulating material capable of taking a high polish. The rod 26 passes through the central openings in the resistance bearing elements 21 and supports the same out of contact with the sides of the casing 9, the rod 26 being cemented or otherwise secured in the opening in the boss 7 attached to the diaphragm 5. The various forms of the microphone may also use a spring disk or washer 27, preferably slightly cupped and formed as indicated in Fig. 3, with a central opening and radial slots 28, leaving an outer continuous margin which is adapted to rest against the margin of the diaphragm 5 and the inner portion of the washer adjacent the central opening is adapted to rest on the inner margin of the annular portion of the casing 9, as indicated in Fig. 2. This arrangement affords a spring pressure between the casing and the diaphragm which tends to force the diaphragm toward the left as in Fig. 2. By turning the screw cap 14 circumferentially, the pressure upon the resistance varying elements 21 may be adjusted, while the diaphragm is always held firmly in position against the cap 14 without the use of rubber or similar gaskets.

The microphones thus far described have been shown as supported only by means of the screw threaded stud 2 attached to the diaphragm 1 by means of the nuts 3. In these cases the variation of the current through the resistance varying elements is accomplished by the movement of the diaphragm 1 which is transmitted to the boss 7, thereby varying the pressure on the resistance bearing elements. The casing 9, however, not being supported in any other way, resists the transverse vibratory motion of the disks or resistance varying elements only through the inertia of the same and attached parts and the resiliency of the mica diaphragm. The method of supporting the microphone is particularly effective in certain instances, hereinafter to be referred to.

Figure 4:
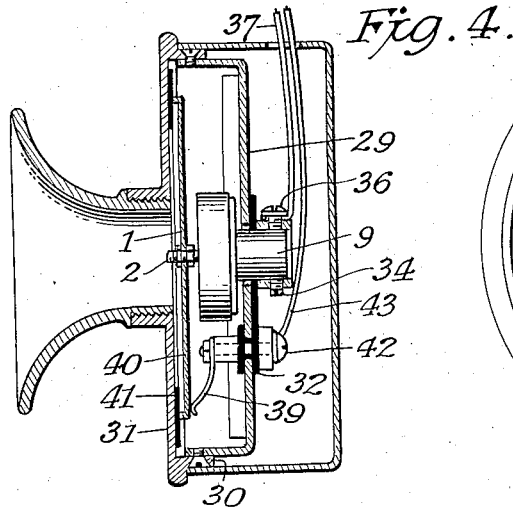
Fig. 4 is a transverse sectional view of one form of my improved microphone applied to a receiving instrument and rigidly mounted within the same.
Figure 5:
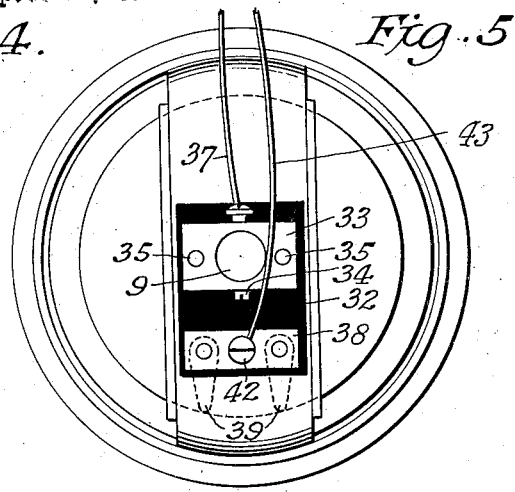
Fig. 5 is a rear view of the same, the outer casing being removed.

However, my improved microphone may be supported in ways now well known in the art, such as by having the casing rigidly supported on the device to which the microphone is attached. Such a manner of mounting is shown in Figs. 4 and 5. The microphone is attached to the diaphragm 1 as hereinbefore described, but the casing 9, instead of being otherwise unsupported, is carried on a transverse bridge or bar 29 engaging a flange 30 carried on the face plate 31 of the apparatus. The bridge 29 is provided with an insulating plate 32 which insulates a rectangular block 33 from said bridge. The cylindrical portion 9 of the casing of the microphone passes through a circular opening in the block 33 and is held in position by the screws 35 which pass through the bridge 29 into said block 33. A binding screw 36 provides means for attaching the lead 37. Below the block 33 is a cross-bar of conductive material 38 which is secured in position on and insulated from the bridge 29 by the insulation 32. The bar 38 is connected with spring fingers 39 which bear upon the metallic diaphragm 40, thereby making electrical contact therewith, the diaphragm 40 being insulated from the face plate 31 by means of an insulating ring 41. Current is thus conducted through the spring fingers 39 to the cross-bar 38 which also carries a binding-screw 42 to which the lead 43 is attached. The energizing current for the microphone is therefore conducted through the lead 37 to the screw 36, thence to the casing 9, thence through the resistance varying element 21 shown in Fig. 1, thence through the boss 7 of Fig. 1, which being metallically connected with the stud 3, conducts the current through the stud 2, conducts the current through the diaphragm 40, thence through the spring fingers 39, through the cross-bar 38, screw 42, and lead 43, it being obvious that the various forms of my improved microphone are energized by the usual energizing battery well known in connection with such devices.

Referring now to Fig. 6, the numeral 44 indicates three insulating tubes of glass or similar material carried within the casing 45 and held in position by suitable metallic semi-cylindrical portions 46. The plate 7 which contacts with the inner side of diaphragm 5 carries a carbon or other conductive disk 47 which engages small carbon cylinders 48 which enter the ends of the tubes 44. Contacting with these are a series of carbon or other resistance varying elements 49 similar to the various forms previously described. The circuit connections for this arrangement are similar to that of the previous forms except that the current is divided into three parallel paths through the three series of carbon disks. This arrangement provides paths of less resistance than those of the forms previously described where comparatively large energizing currents are necessary to be used without heating the resistance varying elements.

In cases where it is necessary to vary the resistance in other ways, for instance, by increasing the length of the path through which the current traverses the resistance bearing elements, I have provided the form shown in Figs. 8 and 9. In this form the casing 50 contains four insulating tubes 51 as indicated in Fig. 9, these being held in position by a suitable frame or spider 52 attached to the end of casing 50, such as by the screw 53 or other means. In this case, however, the diaphragm 5 which carries the internal plate 7 is insulated from the resistance-varying elements within the cylinders 51. The plate 7 carries on its inner face, but insulated therefrom, two semi-circular conducting plates 54, also insulated from each other. These engage small carbon cylinders 55 which enter the ends of the insulating tubes 51 and engage the resistance varying elements 56. The opposite ends of these elements contact with disks 57 of conductive material which carry screw-threaded studs 58 passing through insulating bushings 59. By turning the studs 58, the position of plates 57 may be adjusted to produce the requisite pressure between the resistance varying elements 56. The connections are made by soldering or otherwise fastening the leads to the studs 58. When these resistance varying elements in the four respective tubes are to be connected in series, the arrangement for this purpose is indicated in Fig. 10$^a$, in which case it will be noted that one half of the semi-circular disks 54 connect pairs of resistance varying elements, the opposite ends of one of each pair being connected to the lead-in terminals, while the remaining adjacent ends of each pair are connected together. If it be desired to connect four sets of resistance varying elements of Fig. 9 so that both series of each pair will be in parallel with each other and the two pairs in series, the semi-circular disks 54 in Fig. 10ᵃ are replaced by a continuous disk 54' like that of 47, Fig. 6, the other ends of each pair being connected together, and with the lead-in terminals as indicated in Fig. 10ᵇ. Obviously, all of the screw-threaded pins or studs 58 may be connected together and four sets of resistance varying elements connected in parallel in the same manner as described in connection with Figs. 6 and 7.

In Fig. 16 I have illustrated the application of my improved microphone to the sound box of a talking machine. In this instance, the diaphragm 1, usually of mica, is connected with the diaphragm of the microphone and the other parts arranged as in Fig. 1. However, the screw-threaded stud at the center of the diaphragm is extended, as indicated at 2', and connected with the pivoted arm 60 of the sound box, said arm being supported on the sound box in any suitable manner, such as by a pair of knife edges 61. The diaphragm 1 is secured in the sound-box casing 62 which is connected with the pivoted supporting arm 63 shown in cross-section in Fig. 14, so that the sound-box may follow the grooves of the record in the usual manner. The leads 64 and 65 from the microphone may be carried to any suitable point or points where they are connected with loud speaking horns containing telephone receivers, or they may be connected to amplifying devices in the usual well known way before passing to the loud speaking telephones. This arrangement will allow the phonograph or talking machine to be located in one room and the horns in other rooms, or in different portions of a large room, thus providing music for dancing, etc. It is apparent that the diaphragm 1 may be omitted, in which case the microphone may be supported as indicated in Fig. 4.

In Fig. 17 I have illustrated one manner of applying my microphones to sound receiving systems aboard vessels. In this case, a preferably metallic box 66 having one side open, is placed with its open side in contact with the skin or outer plates 67 of the vessel, suitable packing 68 being provided to make the box liquid tight. The box 66 may be held in position in any suitable way, such as by having channel irons 69 attached to the adjacent ribs of the hull and providing lugs 70 on the box so as to enable rod 71 to connect said channel irons and said lugs, thereby forcing the box firmly against the side of the ship. The upper portion of the box is provided with an opening 72 having a cover 73 held in position by suitable bolts and lugs (not shown), or in any preferred manner. The cover 73 carries a gland 74 through which passes a pipe 75. The lower end of this pipe 75 carries a container 76 having openings 77 in one side thereof. The diaphragms 78 are secured over these openings in any suitable way and the microphones 79 attached thereto, as indicated in Fig. 1. The small flexible leads from these microphones pass to an insulated plate 80 having binding posts 81 thereon, and to these are connected the heavier and more rugged leads 82 which pass through the pipe 75 to be connected to suitable instruments in any desired position on the vessel. The box 66 is filled with water or other liquid which completely surrounds the container 76. Sound waves transmitted by the water and striking on the side of the ship, as indicated by the arrows in Fig. 17. are transmitted to the liquid within the box 66, and thus to the diaphragms 78, thereby producing corresponding variations in the currents carried by the lead wires passing to the various instruments before mentioned.

Having thus described these forms of my invention, I do not wish to be understood as being limited to the details of form and arrangement of parts set forth, for various changes may be made by those skilled in the art without departing from the spirit and scope of my invention as set forth in the accompanying claims.

I have found that by using the various arrangements above described, the microphones are adapted to receive and transmit true musical and similar tones very accurately and with the highest quality of the resulting sounds without distortion or being accompanied by other undesirable sounds.

Furthermore, I have found that the sensitiveness and resonance to particular sounds or notes may be greatly varied by so proportioning the size and number of disks and limiting their contacting areas by means of the openings. Through this capability the microphone may be adapted to carry greater or smaller currents as occasion may demand, without producing undue heat and without diminishing sensitiveness.

A further advantage resulting from the constructions above set forth is the fact that the so-called "packing" of the resistance varying elements heretofore experienced is obviated and that their action is uniform and uninterrupted in any position or at any angle in which the microphone may be placed. However, it will be apparent that granules or balls of carbon or similar material may be used in place of or in addition to the resistance varying plates should the same be found necessary, without affecting the efficiency or advantages of the other novel structural features described and claimed.

What I claim and desire to protect by Letters Patent is:

1. In a microphone, a casing, adjustable retaining means thereon, a resilient diaphragm retained between said casing and means, resilient pressure means between said casing and diaphragm, an insulating member within said casing, a plurality of transverse parts of electrically resistant but conductive material in contact with each other, said parts being of slightly less diameter than and retained in position laterally by said insulating member, and a connecting piece extending from said diaphragm and resting upon said parts, the pressure of said connecting piece on said parts being adapted to be determined by adjustment of said retaining means.

2. In a microphone, a casing, an adjustable ring thereon, a resilient diaphragm retained between said casing and ring, resilient pressure means between said casing and diaphragm, an insulating member within said casing, a plurality of plates of electrically resistant but conductive material in contact with each other and retained in position laterally by said insulating member, and a connecting piece extending from said diaphragm and resting upon said plates, the pressure of said connecting piece on said plates being adapted to be determined by adjustment of said ring.

3. In a microphone, a current varying member comprising a series of plates in contact with each other, and means for producing the requisite pressure between said plates, a plurality of said plates having openings therein to limit the contacting areas.

4. In a microphone, a current varying member comprising, a series of plates of homogeneous electrically resistant but conductive material, and means for producing the requisite pressure between said plates, a plurality of said plates having openings forming an air chamber therein whereby the resonant quality of said microphone is affected.

5. In a microphone, a current varying member, comprising a series of angular plates in contact with each other and having eccentric openings therein, and insulating guides contacting with said angular plates for maintaining said openings in register with each other.

6. In a microphone, a current varying member comprising, a series of angular plates in contact with each other and having eccentric openings therein, an insulating tube surrounding said plates and having means on its interior surface adapted to hold said plates in position to maintain said openings in register with each other.

7. In a microphone, a current varying member comprising, a plurality of transverse parts of electrically resistant but conductive material in contact with each other, an insulating member of slightly greater diameter than said parts, whereby the latter are held in position laterally, a diaphragm, means extending from said diaphragm and adapted to rest upon said parts, and means for varying the pressure on said diaphragm, and through said means, on said parts.

8. In a microphone, a current varying member comprising, a series of plates of electrically resistant but conductive material in contact with each other, an insulating tube of glass by which said plates are held in position laterally, a diaphragm, means extending from said diaphragm and adapted to enter said tube and rest upon said plates, and means for varying the pressure on said diaphragm and through said means, on said plates.

9. In a microphone, a current varying member comprising a casing, a series of plates therein of electrically resistant but conductive material in contact with each other, an insulating member by which said plates are held in position laterally, a diaphragm, means extending from said diaphragm and adapted to rest upon said plates, a spring washer between said diaphragm and the interior of said casing and means for varying the pressure on said diaphragm and through said means, on said plates.

10. A microphone comprising a receptacle, a cap therefor in adjustable engagement therewith, a plurality of electrically resistant but conductive elements within said receptacle, a diaphragm supported within said cap, and a connecting piece extending from said diaphragm and resting upon said elements, the pressure between said connecting piece and said elements being controlled by the relative adjustment of said cap and receptacle.

11. A microphone comprising a receptacle, a cap therefor in threaded engagement therewith, a plurality of electrically resistant but conductive elements within said receptacle, a diaphragm supported within said cap, and a connecting piece extending from said diaphragm and resting upon said elements, the pressure between said connecting piece and said elements being controlled by the relative rotation of said cap and receptacle.

12. A microphone comprising a receptacle, a cap therefor in adjustable engagement therewith, a plurality of electrically resistant but conductive elements within said receptacle, a diaphragm supported within said cap, resilient pressure means intermediate said diaphragm and said receptacle, and a connecting piece extending from said diaphragm and resting upon said elements, the pressure between said connecting piece and said elements being controlled by the relative adjustment of said cap and receptacle.

13. A microphone comprising a receptacle having a cup-shaped recess therein, a cap for said receptacle in adjustable engagement therewith, a plurality of electrically resistant but conductive elements within said cup-shaped recess, a diaphragm supported within said cap, and a connecting piece extending from said diaphragm and resting upon said elements, the pressure between said connecting piece and said elements being controlled by the relative adjustment of said cap and receptacle.

14. A microphone comprising a receptacle having a cup-shaped recess therein, a cap for said receptacle in adjustable engagement therewith, a plurality of electrically resistant but conductive elements within said cup-shaped recess, a diaphragm supported within said cap, resilient pressure means intermediate said diaphragm and said receptacle, and a connecting piece extending from said diaphragm and resting upon said elements, the pressure between said connecting piece and said elements being controlled by the relative adjustment of said cap and receptacle.

Signed at New York, N. Y., this 11th day of April, 1922.

WILLIAM L. WALKER.